United States Patent
Bächler (10) Patent No.: US 12,030,193 B2
(45) Date of Patent: Jul. 9, 2024

(54) METHOD FOR ROBOT-ASSISTED WIRING OF ELECTRICAL COMPONENTS OF AN ELECTRICAL SWITCHGEAR ARRANGED ON A MOUNTING PLATE

(71) Applicant: RITTAL GMBH & CO. KG, Herborn (DE)

(72) Inventor: Andreas Michael Bächler, Haiger (DE)

(73) Assignee: RITTAL GMBH & CO. KG (DE)

( * ) Notice: Subject to any disclaimer, the term of this patent is extended or adjusted under 35 U.S.C. 154(b) by 471 days.

(21) Appl. No.: 17/416,640

(22) PCT Filed: Nov. 27, 2019

(86) PCT No.: PCT/DE2019/101017
§ 371 (c)(1),
(2) Date: Jun. 21, 2021

(87) PCT Pub. No.: WO2020/125851
PCT Pub. Date: Jun. 25, 2020

(65) Prior Publication Data
US 2022/0072713 A1    Mar. 10, 2022

(30) Foreign Application Priority Data

Dec. 21, 2018  (DE) ............... 10 2018 133 319.6

(51) Int. Cl.
*B25J 9/16* (2006.01)
*B25J 13/08* (2006.01)
(Continued)

(52) U.S. Cl.
CPC .......... *B25J 9/1687* (2013.01); *B25J 9/1664* (2013.01); *B25J 9/1671* (2013.01); *B25J 9/1682* (2013.01);
(Continued)

(58) Field of Classification Search
CPC ...... B25J 9/1664; B25J 9/1671; B25J 9/1682; B25J 9/1687; B25J 13/08;
(Continued)

(56) References Cited

U.S. PATENT DOCUMENTS 4,010,996 A * 3/1977 Hopkins ............... H01R 13/629
439/291
4,050,764 A * 9/1977 Hopkins ................ H01R 43/01
439/465
(Continued)

FOREIGN PATENT DOCUMENTS

BE    1019651 A5   9/2012
DE    4431254 A1   3/1996
(Continued)

OTHER PUBLICATIONS

Anonymous. "Schaltschrankbau-Unterverteilung und Gehäuse Automatisches Verdrahten Schaltschrankbau-Unterverteilung und Gehäuse", Jun. 22, 2015 (Jun. 22, 2015), Retrieved from the Internet: https://www.schaltschrankbau-magazin.de/artikel/automatisches-verdrahten/print/ [retrieved on Mar. 2, 2020] XP055672878 the whole document.
(Continued)

*Primary Examiner* — Jason Holloway
*Assistant Examiner* — Blake A Wood
(74) *Attorney, Agent, or Firm* — Harness, Dickey & Pierce, P.L.C.

(57) ABSTRACT

A method for robot-assisted wiring of electrical components of an electrical switchgear arranged on a mounting plate. The method includes providing a planning of a switchgear which has at least location information about a plurality of electrical components of the switchgear on a mounting plate and wiring information about a plurality of electrical wirings between every two of the electrical components. A cable
(Continued)

routing is extracted including a cable source coordinate and cable destination coordinates and a routing path between the cable source coordinate and the cable destination coordinate from the wiring information for at least one of the plurality of wirings. Trajectory and/or vector points are generated along the cable routing and parameter to parameterize the trajectory and/or vector points to generate robot control.

15 Claims, 12 Drawing Sheets

(51) Int. Cl.
  *H02B 1/20* (2006.01)
  *H02B 3/00* (2006.01)
(52) U.S. Cl.
  CPC .............. *B25J 13/08* (2013.01); *H02B 1/202* (2013.01); *H02B 3/00* (2013.01); *G05B 2219/40519* (2013.01); *G05B 2219/45097* (2013.01)
(58) Field of Classification Search
  CPC ........... G05B 2219/40519; G05B 2219/45097; H01R 43/28; H02B 1/202; H02B 3/00; H02G 1/1248; H02G 1/14; H05K 13/06
  See application file for complete search history.

(56) References Cited

U.S. PATENT DOCUMENTS

| 2016/0203890 | A1* | 7/2016 | Horiki | H01R 43/20 |
| | | | | 29/755 |
| 2018/0021950 | A1* | 1/2018 | Shimodaira | B25J 13/02 |
| | | | | 318/568.11 |
| 2018/0109083 | A1* | 4/2018 | Fenker | H05K 7/1498 |
| 2019/0081463 | A1* | 3/2019 | Bentley | H02B 3/00 |
| 2020/0388997 | A1 | 12/2020 | Bachler | |
| 2021/0397165 | A1* | 12/2021 | Georgi | G05B 19/41805 |

FOREIGN PATENT DOCUMENTS

| DE | 102015103444 A1 | 9/2016 |
| EP | 0259394 B1 | 8/1991 |
| EP | 0917259 B1 | 8/2001 |
| EP | 3392987 A1 | 10/2018 |

OTHER PUBLICATIONS

M. Busi et al. "The WIRES Experiment: Tools and Strategies for Robotized Switchgear Cabling", Procedia Manufacturing, 43rd North American Manufacturing Research Conference, NAMRC 43, Jun. 8-12, 2015, UNC Charlotte, North Carolina, United States, vol. 11,Jan. 1, 2017 (Jan. 1, 2017), pp. 355-363 DOI: 10.1016/j.promfg. 2017.07.118 ISSN: 2351-9789, XP055539776 the whole document.
System Robot Automazione. "Syndy, The independent solution", Visano, Italy, Mar. 31, 2012 (Mar. 31, 2012), pp. 1-16, Retrieved from the Internet: <http://www.systemrobot.it/en/crlines/wiring-syndy [retrieved on Jan. 9, 2019] XP055539797 p. 13-p. 14.
International Search Report (in English and German) and Written Opinion of the ISA (in German) issued in PCT/DE2019/101017, dated Mar. 13, 2020; ISA/EP.
German International Preliminary Report on Patentability issued in PCT/DE2019/101017, dated Nov. 5, 2020.

* cited by examiner

METHOD FOR ROBOT-ASSISTED WIRING OF ELECTRICAL COMPONENTS OF AN ELECTRICAL SWITCHGEAR ARRANGED ON A MOUNTING PLATE

CROSS-REFERENCE TO RELATED APPLICATIONS

This application is a U.S. National Phase Application under 35 U.S.C. 371 of International Application No. PCT/DE2019/101017, filed on Nov. 27, 2019, which claims the benefit of German Application No. 10 2018 133 319.6, filed on Dec. 21, 2018. The entire disclosures of the above applications are incorporated herein by reference.

BACKGROUND

This section provides background information related to the present disclosure which is not necessarily prior art.

TECHNICAL FIELD

The invention relates to a method for robot-assisted wiring of electrical components of an electrical switchgear arranged on a mounting plate.

DISCUSSION

In the production of switchgear and control systems, the wiring of electrical components is one of the central and most time-consuming work processes, which is still carried out manually to a large extent. Not only the high complexity of this work process, but above all the demand for one hundred percent faultlessness places great demands on the employee carrying out the wiring.

For the optimization of the wiring process, there are various technical aids in different support levels. These range from hand tools and/or semi-automatic machines for cable assembly to fully automatic systems that completely assemble individual wires, i.e., cut to length, strip, apply ferrule and crimp. The pre-assembled cables produced in this way can then be output as loose and individual wires, as sequentially interconnected or strung wires, or as wire bundles. A cable sequence wound onto a reel is known from DE 10 2015 103 444 A1. BE 101 965 1 A describes a multifunctional processing head integrated into the end effector of a wiring system. DE 44 31 254 A1 and EP 0917259 B1 each describe a method and a device for wiring connection points of components of electrical devices. EP 0259394 B1 describes a tool for laying cables.

SUMMARY

This section provides a general summary of the disclosure, and is not a comprehensive disclosure of its full scope or all of its features.

It is therefore one aspect of the invention to further develop a process of the type described above in such a way that it has an as high as possible degree of automation.

Accordingly, the process comprises:

Providing a planning of a switchgear having at least location information and orientation information about a plurality of electrical components of the switchgear on a mounting plate and wiring information about a plurality of electrical wirings between every two of the electrical components;

Extracting a cable routing including a cable source coordinate, a cable destination coordinate, and a routing path between the cable source coordinate and the cable destination coordinate from wiring information for at least one of the plurality of wirings;

Generating trajectory and/or vector points along the cable routing and parameterizing the trajectory and/or vector points to generate robot control; and Controlling a robot with the robot controller.

The planning of the switchgear, i.e. in particular the location information and orientation information about the plurality of electrical components of the switchgear as well as the wiring information concerning the wiring of the components can be provided, for example, directly from a 3D-ECAD system. Supplementary information concerning the electrical switchgear, as far as it can support the wiring, can also be obtained via this system. This information can include, for example, an individual cable assembly of the wiring.

The method may comprise applying a test routine to the wiring information to determine a degree of automation of the wirings and, if necessary, adjusting the wiring information to maximize the degree of automation. Determining the degree of automation of the wiring may include determining an automation suitability of individual wiring steps in each of which two electrical components of the electrical switchgear are wired together.

Said providing of the planning and said applying of the test routine to the wiring information as well as, if necessary, said adapting of the wiring information to maximize the degree of automation can be carried out computer-aided and therefore basically independent of location and therefore does not necessarily have to be carried out on an automatic wiring machine provided for the wiring, for example. The adapted wiring information can be imported to the wiring system, for example, by manual call-up at an automatic wiring machine or by automatic identification by means of reading in a product identification code, for example an RFID chip.

Providing the switchgear planning may further provide component information from the planning, preferably at least one of a dimension or contour of the mounting plate, a type of at least one of the electrical components or another component of the electrical switchgear, a connection type of at least one of the electrical components, a connection coordinate and/or a connection vector of at least one of the electrical components, or a geometry of at least one of the electrical components or another component of the electrical switchgear.

Applying a test routine to the wiring information to determine a degree of automation of the wirings may include, for example, checking at least one connection type (conductor terminal or the like) of one of the electrical components and/or the connection coordinate of one of the electrical components for automatable contacting. For example, a connection angle of a conductor terminal of an electrical component may be outside or within an angle range operable by a wiring robot.

The method may further comprise optically detecting an actual arrangement of the electrical components on the mounting plate and matching the location information and orientation information to the actual arrangement. The optical detection of an actual arrangement of the electrical components on the mounting plate may comprise scanning a mounting plane of the mounting plate on which the electrical components are arranged. The scanning may be performed by means of a robot, preferably by means of the robot controlled by the robot controller, for example by means of an articulated arm robot having a multifunctional end effector with an optical detection device, for example a camera or with a scanner. The jointed-arm robot can scan the mounting plate plane line by line with the camera. With the aid of the optically detected actual arrangement of the electrical components, actual data on the local arrangement of the electrical components on the mounting plate level can be recorded and compared with the target data contained in the planning of the switchgear, the location information and orientation information of the planning. It can be provided that if a tolerance value for the local arrangement of one or more components is exceeded, an adjustment of the location information and orientation information to the actual arrangement of the components is carried out.

The optical detection of the actual arrangement of the electrical components can include the optical detection of an individual identification, such as a QR code, of the electrical components. However, the identification of the electrical components can also be performed using common methods of image recognition, in which individual components of the electrical switchgear are inferred from the geometry of the detected components and a relative arrangement of different components to each other on the mounting level.

The method may comprise optically detecting an actual arrangement of the electrical components on the mounting plate and adjusting the cable routing according to a detected offset between the actual arrangement of the electrical components and the location information and orientation information.

The method may further comprise generating additional trajectory and/or vector points outside the cable routing, which are taken into account when parameterizing the trajectory and/or vector points for generating the robot control. This is particularly useful if the planning of the switchgear has an idealized cable routing, for example with cables fed perpendicular to the electrical components and/or with a cable routing between the contacted components that consists exclusively of straight course sections of the cable that merge into each other via right angles. For the automation of such wiring, it can be useful to soften the right angles into round wire direction changes by cable length additions or to enable contacting of the components even at an actual contacting angle that deviates from the ideal angle of the planning.

In this case, generating additional trajectory and/or vector points outside the cable routing may comprise relocating trajectory and/or vector points located on the cable routing so that they are located outside the cable routing. In the case where the extracting process extracts a routing path of one of the electrical wirings that has a 90° change in direction, additional trajectory and/or vector points may be created that are located a distance ahead of the outer radius of the 90° change in direction. The additional trajectory and/or vector points outside the cable routing can thus be generated in particular at points of the cable routing where the cable routing has a change of direction, for example a 90° change of direction.

Generating additional trajectory and/or vector points outside of the cable routing may include generating trajectory and/or vector points that lie on a trajectory curve that has a specified minimum radius.

The trajectory and/or vector points for a first wire having a first conductor cross-section greater than a second conductor cross-section of a second wire may be generated along a trajectory curve having a radius greater than the radius of the trajectory curve along which the trajectory and/or vector points for the second wire are generated.

The generation of trajectory and/or vector points and the parameterization of the trajectory and/or vector points to generate the robot control may comprise the application of prefabricated programming blocks. For example, a 90° change of direction of the cable laying path to be obtained with a standardized set of trajectory and/or vector points around the cable laying path according to planning may comprise obtaining a cable laying path that can be automated and parameterized.

The optical detection of an actual arrangement of the electrical components on the mounting plate may comprise the optical detection of obstacles and/or the simultaneous determination of deviations between the location information and orientation information of the planning and the actual arrangement of the electrical components on the mounting plate as well as the simultaneous adjustment of the cable routing.

The method may further comprise extracting a wire connection direction from the wiring information and generating trajectory and/or vector points along the wire connection direction, and parameterizing these trajectory and/or vector points to generate the robot controller.

The method may further comprise extracting a cable end treatment from the wiring information, the method comprising parameterizing a gripping motion adapted to the cable end treatment for controlling the robot.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Further details of the invention are explained with reference to the figures below. Thereby shows.

DETAILED DESCRIPTION

Example embodiments will now be described more fully with reference to the accompanying drawings.

Figure 1:
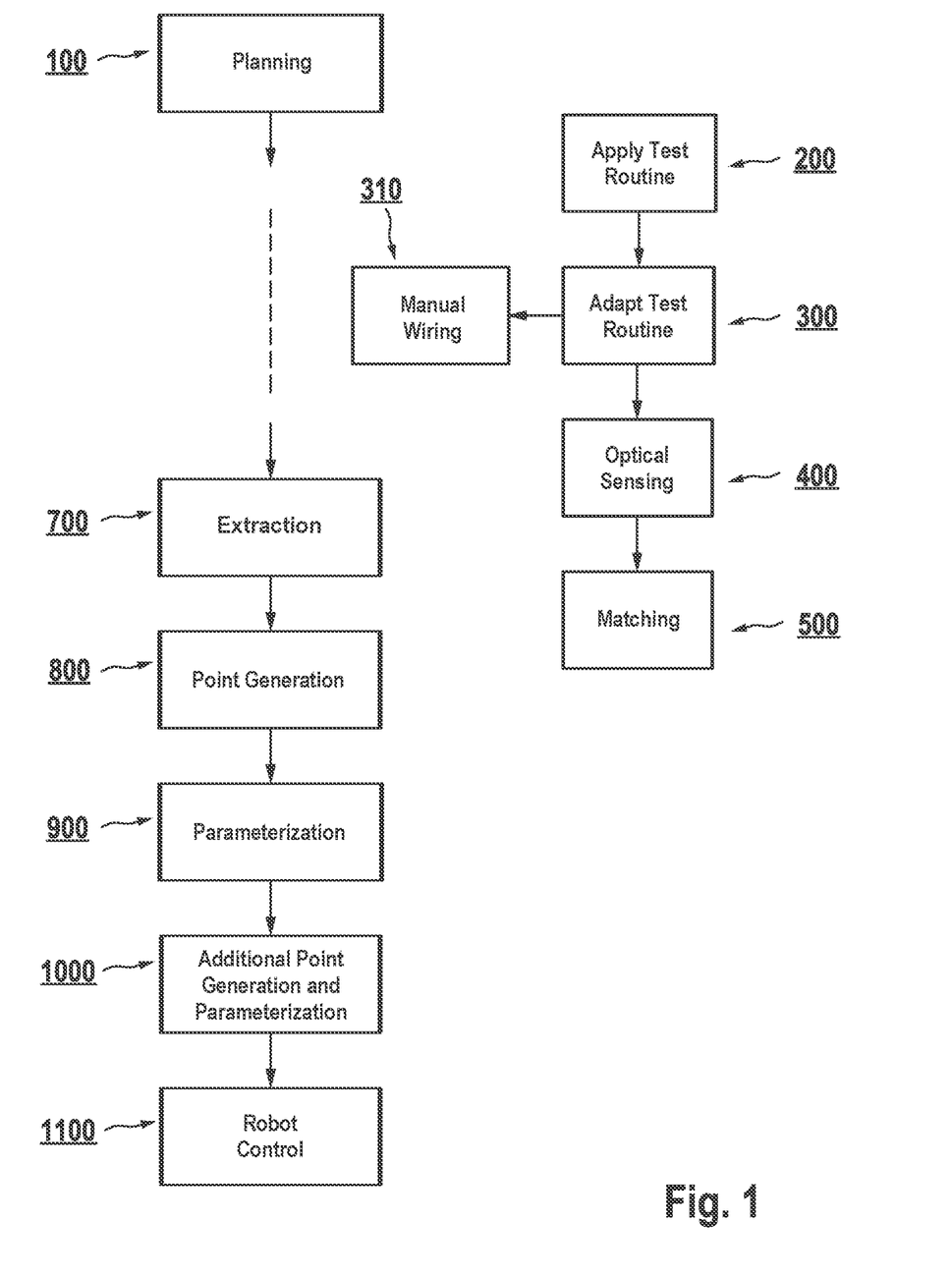
FIG. 1 a schematic flow diagram of an exemplary method for the robot-assisted wiring of electrical components of an electrical switchgear system arranged on a mounting plate.

In the method shown in FIG. 1, in a step 100, a planning of a switchgear is provided which includes at least location information and orientation information about a plurality of electrical components of the switchgear on a mounting plate and wiring information about a plurality of electrical wirings between every two in the electrical components.

In a step 200, a test routine is applied to the wiring information to determine a degree of automation of the wirings. Depending on the result of the application of the test routine, the wiring information may be adapted in a subsequent step 300 to maximize the degree of automation. The adjustment may be iterative, with intermediate repetitions of the method step 200 in each case.

In the optional step 200, the test routine can be applied to the wiring information to determine a maximum feasible degree of automation of the wiring, taking into account the functional scope of an available device for performing the wiring method. Thereupon, the wiring information can be adapted, if necessary, in order to maximize the degree of automation, for example, taking into account the device available for carrying out the wiring method.

In the course of adapting the wiring information in step 300, wiring steps that cannot be automated can be separated out for manual wiring 310, so that they are disregarded in automated wiring 310. In this respect, the method may be computerized as described in EP 3392987 A1.

The method may further comprise optically detecting 400 an actual arrangement of the electrical components on a mounting plate provided for wiring, and matching 500 the location information and orientation information to the actual arrangement. The optical sensing 400 may include scanning the mounting plane of the mounting plate with a laser profile measurement system and/or using common image recognition techniques. Alternatively, optical sensing may be performed using a stationary camera 14 or a camera 14 mounted on the robot 8.

In a step 700, a cable routing including a cable source coordinate, a cable destination coordinate, and a routing path between the cable source coordinate and the cable destination coordinate is extracted from the wiring information for at least one of the plurality of wirings.

In the step 800, trajectory and/or vector points are generated along the cable routing, and in a step 900, the trajectory and/or vector points are parameterized to generate a robot controller.

The step 1000 comprises generating additional trajectory and/or vector points and parameterizing the additional trajectory and/or vector points to generate the robot controller using prefabricated programming blocks.

In the step 1100, a robot is controlled using the robot controller so that automated wiring of the electrical components of the electrical switchgear is achieved. To the extent that the wiring cannot be automated, it can be performed manually and computer-aided, as described in EP3392987 A1.

In the step 1100, the automatic wiring of the electrical components can be performed in a predetermined wiring sequence and taking into account the—possibly adjusted—wiring information and the adjusted location information and orientation information. The wiring may comprise the removal of an at least partially pre-assembled or an unassembled cable with a robot from a transfer interface. The wiring may alternatively or additionally comprise the sequential production of a plurality of individually pre-assembled cables in the wiring sequence, optionally "in-time" with the wiring, so that at the transfer interface always just the cable to be wired next is provided for the pick-up.

The automated wiring may comprise taking an at least partially preassembled cable or an unassembled cable with a robot, preferably with an articulated arm robot, from a transfer interface for transferring the at least partially pre-assembled or unassembled cables.

Removing an at least partially pre-terminated cable may comprise removing a cable cut to a specified length from the transfer interface of an automatic cable cutting machine.

After the cable has been removed from the transfer interface, the method may further comprise the assembly of at least one at least partially preassembled or one unassembled end of the cable, for which purpose the cable end is fed with the robot to an automatic cable end processing machine and is removed again by the latter after the cable end treatment has been completed.

The removing may comprise gripping a first pre-terminated cable end of the pre-terminated cable and feeding and electrically contacting the first pre-terminated cable end to a cable connection point of a first electrical component.

The method may further comprise sequentially transferring a plurality of individually pre-assembled cables via a transfer interface to at least one robot, preferably configured as an articulated arm robot.

Likewise, the automated wiring may comprise the pre-assembly of a plurality of cables in the wiring order as well as taking into account wiring information. For example, for each wiring of two electrical components, the wiring information may include at least one cable routing and at least one cable condition, preferably a cable length, a cable cross-section, a cable color, a wire end treatment, and/or a cable marking.

After a cable end has been fed to an electrical component and electrically contacted with it, the method can include performing a pull-off check, for which purpose a robot engages the contacted cable end with a tensile force-sensitive gripper, for example, and applies a predetermined pull-off force to the cable end against a contacting direction of the cable end. Proper contacting of the cable end can be assumed if the contacting withstands the predetermined pull-off force and, in particular, if there is no decontacting of the cable end. Furthermore, an electrical test of the contacting can be carried out, for example with the aid of a contact resistance measurement.

The removal of a pre-assembled or unassembled cable with a robot can comprise the removal of a first cable end of the cable with a first robot and the removal of a second cable end of the cable with a second robot. Consequently, the cable is held at its two ends by different robots. In this embodiment, the two robots can be operated in a master-slave mode until one of the two cable ends is contacted, in which the master robot feeds the cable end to be wired first before the other cable end to one of the electrical components, while the slave robot feeds the cable to be wired subsequently in the simultaneously executed step.

Tracking may comprise holding the cable end to be subsequently wired at a minimum distance from a mounting plane of the mounting plate and/or tightening the cable end to be subsequently wired when the cable is flexurally slack and/or holding the cable end to be subsequently wired under a mechanical bias.

Figure 2:
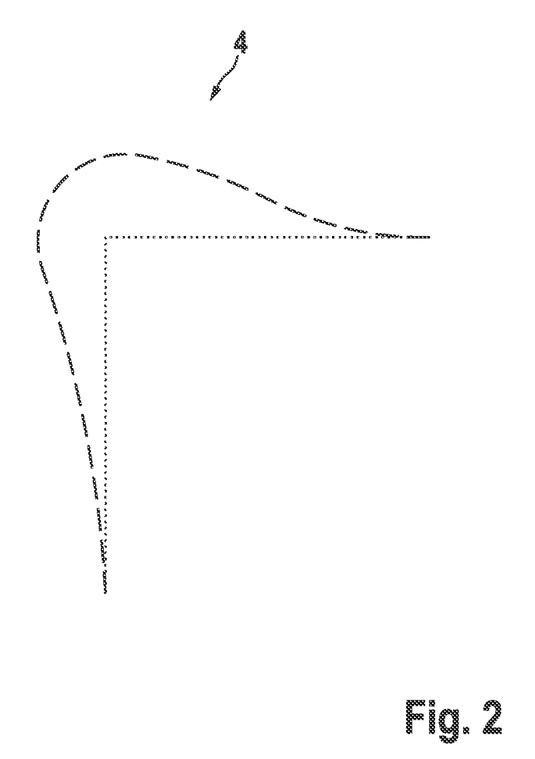
FIG. 2 schematically the generation of additional trajectory and/or vector points outside the cable routing in the area of a 90° change of direction of the cable routing.
Figure 3:
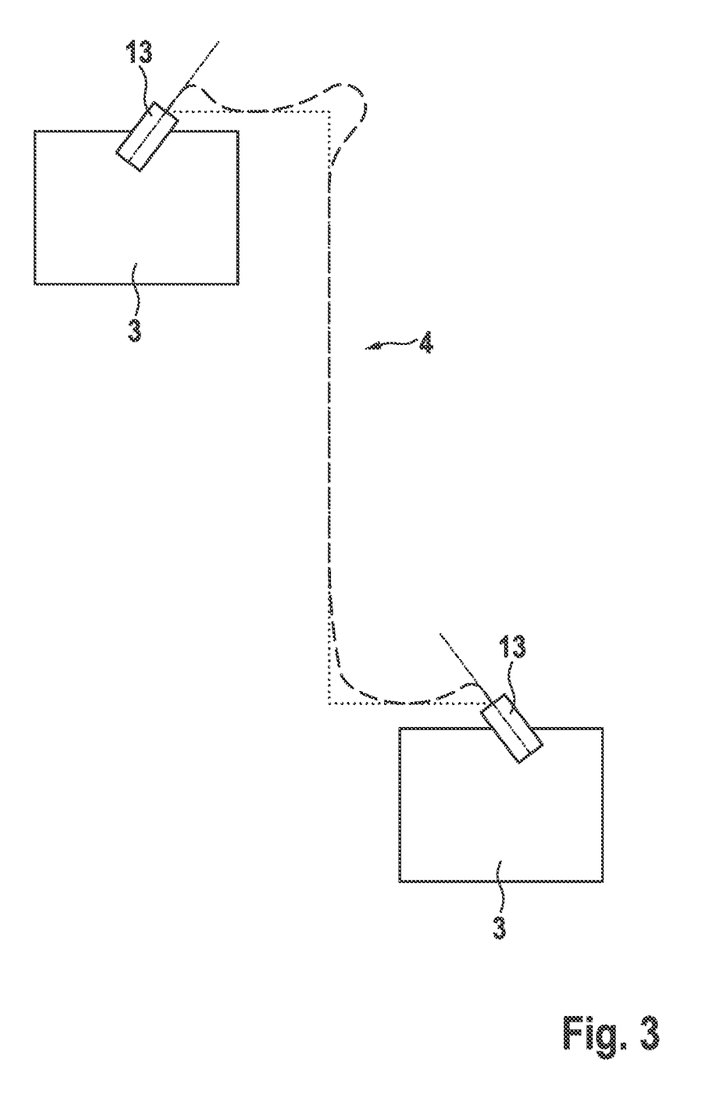
FIG. 3 the generation of additional trajectory and/or vector points outside the cable routing for the entire cable length between two electrical components in contact with each other.

FIG. 2 illustrates the generation of additional trajectory and/or vector points along the drawn dash line outside the idealized cable routing specified by the planning (represented by the dot line) in the area of a 90° change in direction of the cable routing, and FIG. 3 illustrates the generation of additional trajectory and/or vector points outside the cable routing for the entire cable run between two electrical components in contact with each other.

The method may further comprise generating additional trajectory and/or vector points outside the cable routing, which are taken into account when parameterizing the trajectory and/or vector points for generating the robot control. This is particularly useful if the planning of the switchgear has an idealized cable routing, for example with cables fed perpendicular to the electrical components and/or with a cable routing between the contacted components that consists exclusively of straight course sections of the cable that merge into each other via right angles. For the automation of such wiring, it can be useful to soften the right angles into round wire direction changes by cable length additions or to enable contacting of the components even at an actual contacting angle that deviates from the ideal angle of the planning.

The generation of additional trajectory and/or vector points outside the cable routing can involve the relocation of trajectory and/or vector points located on the cable routing so that they are located outside the cable routing. For example, in the case of a 90° change in direction of the cable routing provided for according to the planning, additional trajectory and/or vector points can be generated which are located a distance ahead of the outer radius of the 90° change in direction.

The additional trajectory and/or vector points are generated outside the cable routing instead of the idealized cable routing specified by the planning, for example at positions of the cable routing where it has an abrupt change of direction, in this case a 90° change of direction between two straight and perpendicular cable sections. The generation of the additional trajectory and/or vector points outside the cable routing features the generation of trajectory and/or vector points that lie on a path curve that has a certain minimum radius, for example a minimum radius of 5 cm, which simplifies the automated wiring.

The electronic components 3 each have a cable connection point 13 with a cable connection direction drawn by a dot line. Accordingly, generating the additional trajectory and/or vector points outside the cable routing may comprise generating trajectory and/or vector points lying along the cable connection direction of the electronic component 3 in question.

FIGS. 4 to 12 show exemplary embodiments for devices for carrying out the method according to the invention for robot-assisted wiring of electrical components 3 of an electrical switchgear 2 to be formed on a mounting plate 1. The mounting plate 1 is held in horizontal alignment by a mounting plate handling carriage 12, so that the components 3 can be accessed from above via a robot 8 for the purpose of cable feed and cable connection.

The exemplarily described devices for carrying out the method according to the invention can be connected to an ECAD system, via which a planning of the switchgear is provided, if necessary a test routine is applied to the wiring information and thereupon the wiring information is adapted to maximize the degree of automation. The application of the test routine to the wiring information and the adjustment of the wiring information to maximize the degree of automation can also be performed independently of the ECAD system on a separate computer system that interfaces with both the ECAD system and the electrical component wiring device. The computer system can then obtain the switchgear planning from the ECAD system, apply the test routine to the wiring information, and make any necessary adjustments to the wiring information. The computer system may also be adapted to extract the wire routing, including cable source coordinate and/or vector, cable destination coordinate and/or vector, and routing path between the cable source coordinate and the cable destination coordinate, from the wiring information for at least one of the plurality of wirings. The computer system may also be configured to generate the trajectory and/or vector points along the cable routing and to parameterize the trajectory and/or vector points to generate a robot control. The computer system may be part of the apparatus for performing the wiring operation.

The apparatus for performing the wiring operation may have a multifunctional end effector with an optical detection device for optically detecting the actual arrangement of the electrical components on the mounting plate. After the actual arrangement of the electrical components is detected by the optical detection means of the multifunctional end effector, this information can be used to perform alignment of the location information and orientation information with the actual arrangement by the computer system, if necessary. The computer system then sends a correspondingly adjusted planning of the switchgear or a machine control program generated therefrom to the device for wiring the electrical components, so that the device can perform the automated wiring of the electrical components in a predetermined wiring sequence, which may have been revised by the computer system as part of the adjustment of the wiring information to maximize the degree of automation.

Figure 4:
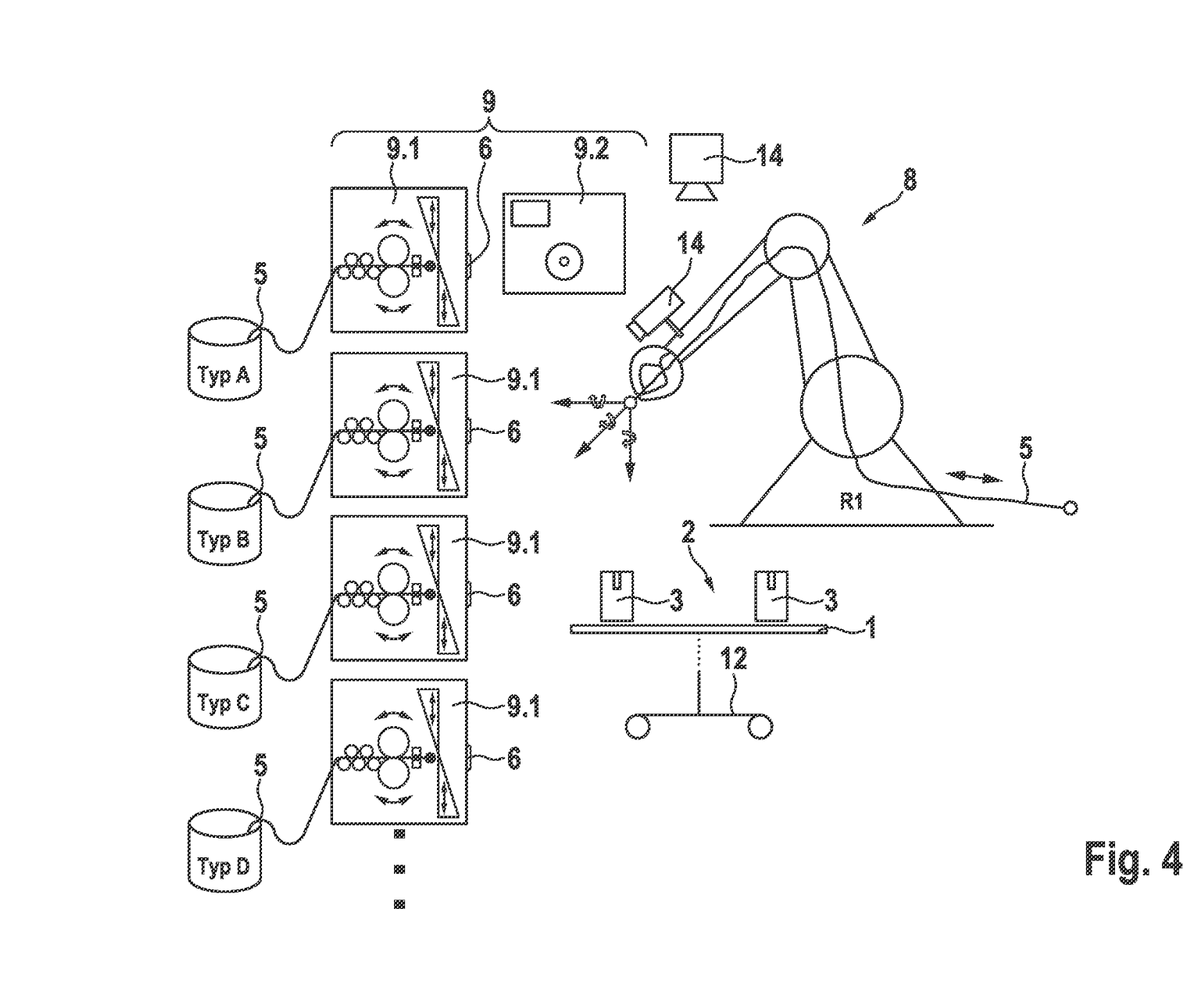
FIG. 4 a first embodiment of an exemplary device for carrying out a method according to the invention.

In the embodiment of the device shown in FIG. 4, a plurality of automatic cable cutters 9.1 each provide cables of a specific type, e.g. types A-D, and each of a specific length. The cable types may differ, for example, in cable cross-section, cable color, or other cable characteristic. All cable characteristics, including the cable length, can be taken from the planning of the switchgear, for example in the form of a planning file provided by the ECAD system.

The single-arm articulated robot 8 takes off directly from an interface 6 of the automatic cable cutting machine 9 providing the cable 5 of the desired type in order to feed the cut cable 5 for the wire end treatment of the intended type to the automatic wire end treatment machine 9.2 one after the other with both ends 7 for the respectively required post-treatment. The post-treatment can include, in particular, stripping the insulation, applying a wire end ferrule and crimping the wire end ferrule.

After the wire end treatment, the single-arm articulated robot 8 can process the pre-assembled cable 5 thus obtained on the mounting plate 1 in accordance with the planning of the switchgear 2 in the manner described with reference to FIG. 1, in particular wire components 3 of the switchgear 2 in accordance with a planning of the switchgear 2.

Figure 5:
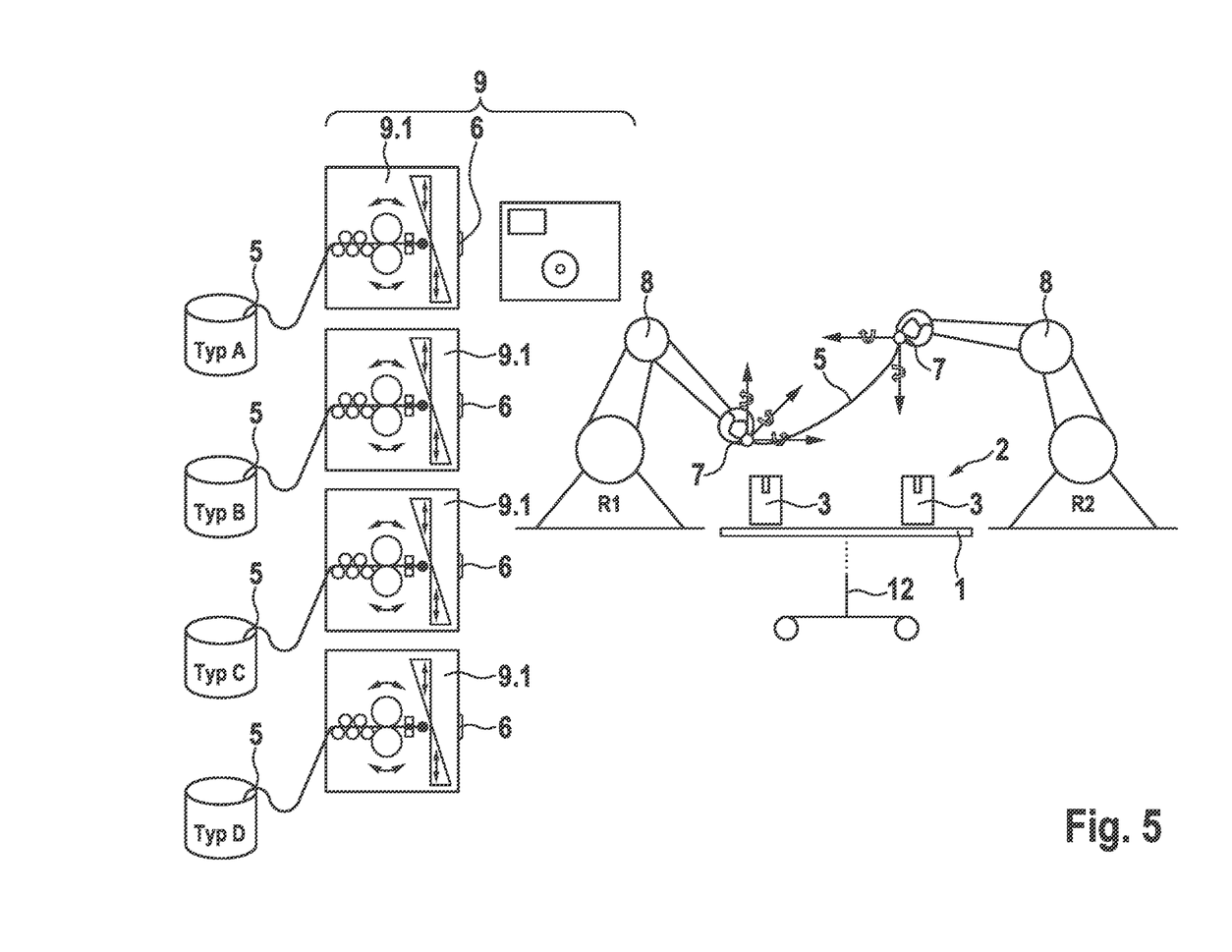
FIG. 5 a second embodiment of an exemplary device for carrying out the method according to the invention.

The embodiment shown in FIG. 5 differs from the embodiment shown in FIG. 4 in that a two-arm jointed-arm robot 8 is used instead of a one-arm jointed-arm robot 8. Insofar as the present application refers to a first and a second robot, in particular to a first and a second jointed-arm robot 8, this can also be realized by the two-arm jointed-arm robot 8 shown in FIG. 5. The two arms of the jointed-arm robot 8 can work cooperatively as described with reference to FIG. 1. In particular, by operating the two robots 8 in a master-slave mode, in which a master robot 8 is provided for wiring a first cable end 7, while the slave robot 8 is provided for tracking the opposite cable end 7, for example in such a way that a certain minimum distance of the opposite cable end 7 from the mounting plate 1 is maintained, in order to avoid tangling of the cable 5 with electrical components 3 arranged on the mounting plate 1, or in order to favor the insertion of the cable 5 into a cable duct during the cable routing performed by the robots between the two components 3 to be electrically contacted with each other.

Figure 6:
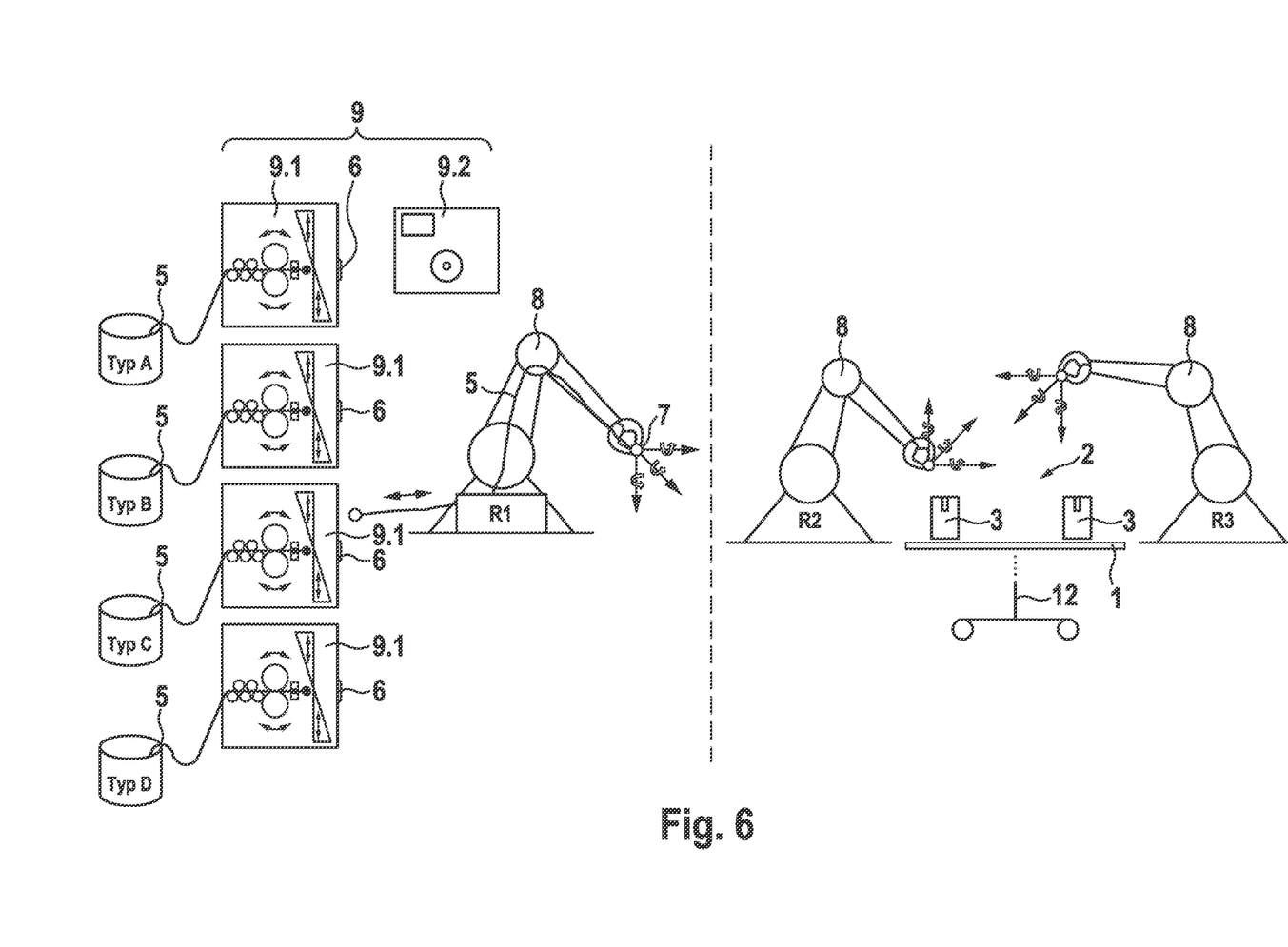
FIG. 6 a third embodiment of an exemplary device for carrying out the method according to the invention.

The embodiment shown in FIG. 6 differs from the embodiment shown in FIG. 5 in that a further jointed-arm robot 8 is provided to produce in-time preassembled cables in the manner described above with the aid of the automatic cable assembly machines 9.1, 9.2 and to transfer them to the two-arm jointed-arm robot 8.

Figure 7:
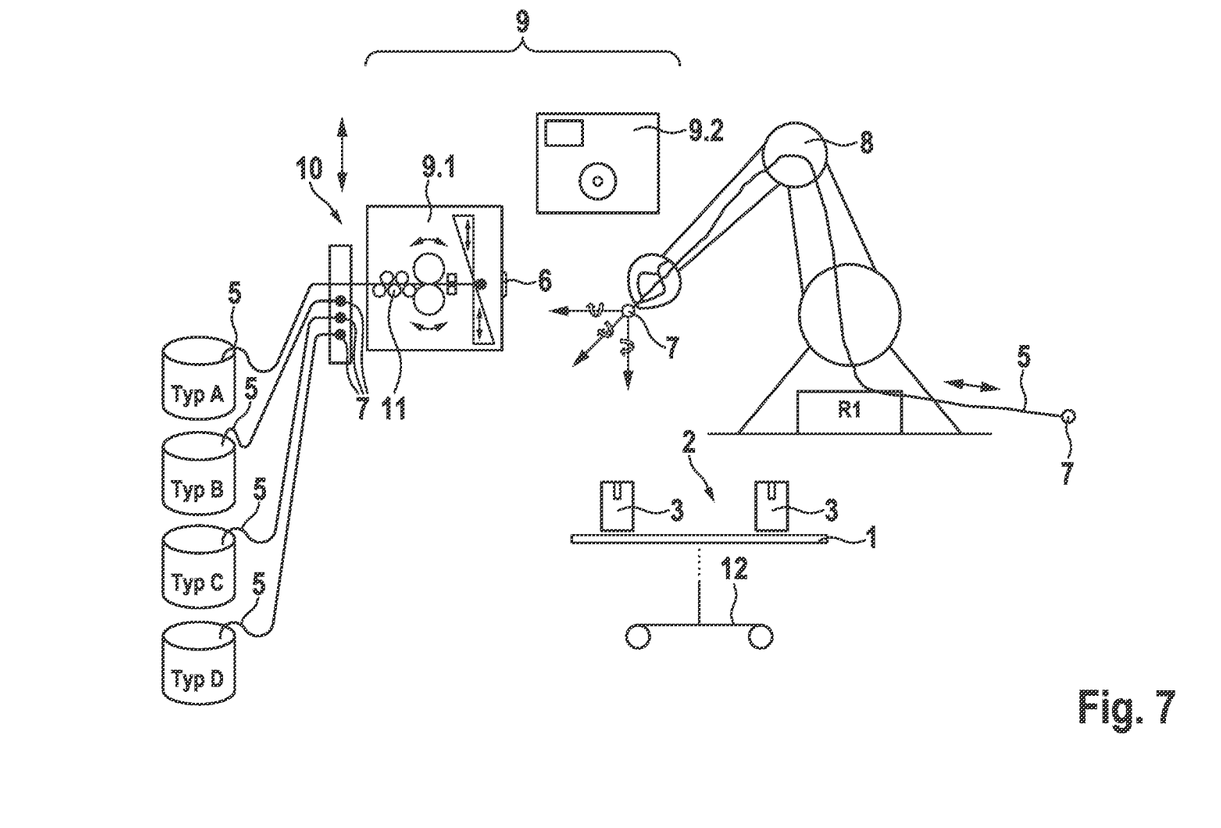
FIG. 7 a fourth embodiment of an exemplary device for carrying out the method according to the invention.

The embodiment shown in FIG. 7 illustrates the use of a wire changer 10, with the aid of which a single automatic cable cutting machine 9.1 is supplied as required with different types of cables of types A-D, which are obtained from different sources, for example from the cable drums shown. A transport system 11 of the automatic cable cutting machine 9.1 takes a wire end from the wire changer 10, which is provided at the wire changer 10 as required. The wire changer 10 is movable in relation to the transport system 11 between its different take-off points (illustrated by the vertical double arrow), so that a desired wire type A-D can be supplied to the automatic cable cutting machine 9.1 as required.

Figure 8:
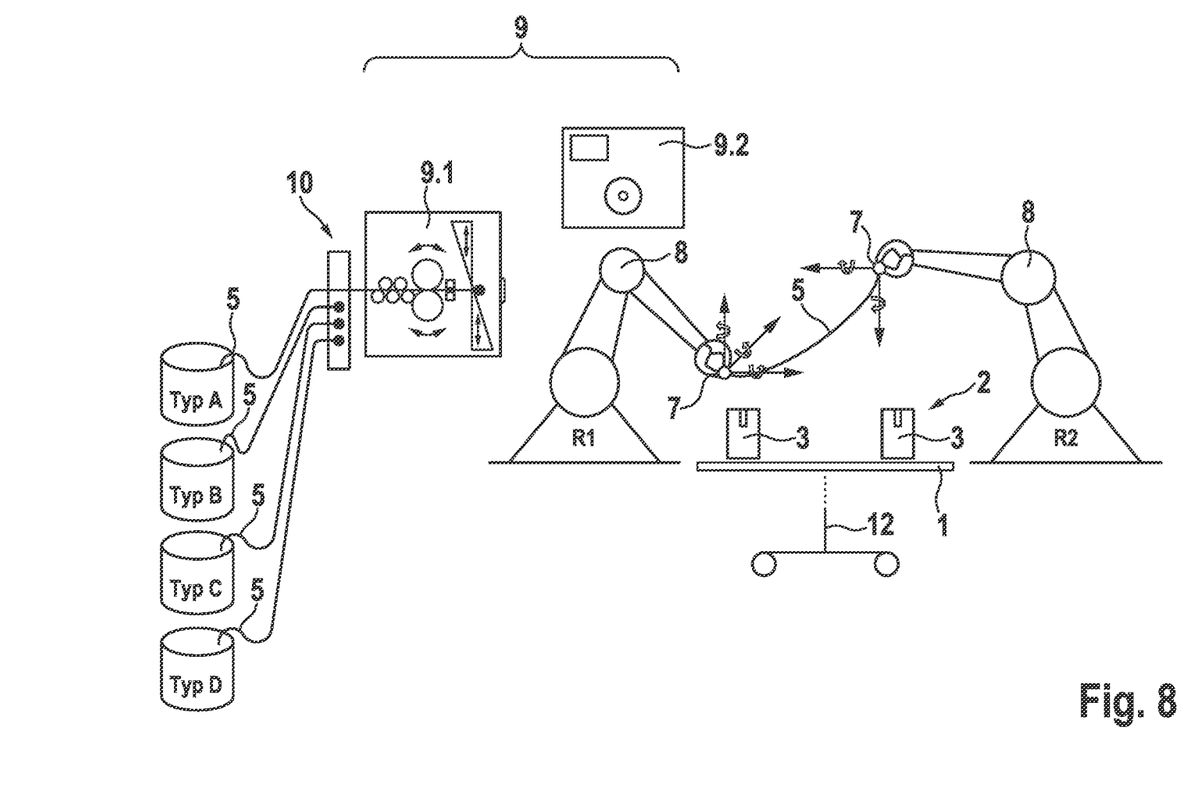
FIG. 8 a fifth embodiment of an exemplary device for carrying out the method according to the invention.

The embodiment according to FIG. 8 shows a variant of the embodiment according to FIG. 7, in which a two-armed articulated-arm robot 8 or two one-armed articulated-arm robots 8 is/are used instead of a one-armed articulated-arm robot 8. The guidance of the cable ends can be carried out under the conditions as described with reference to FIG. 5.

Figure 9:
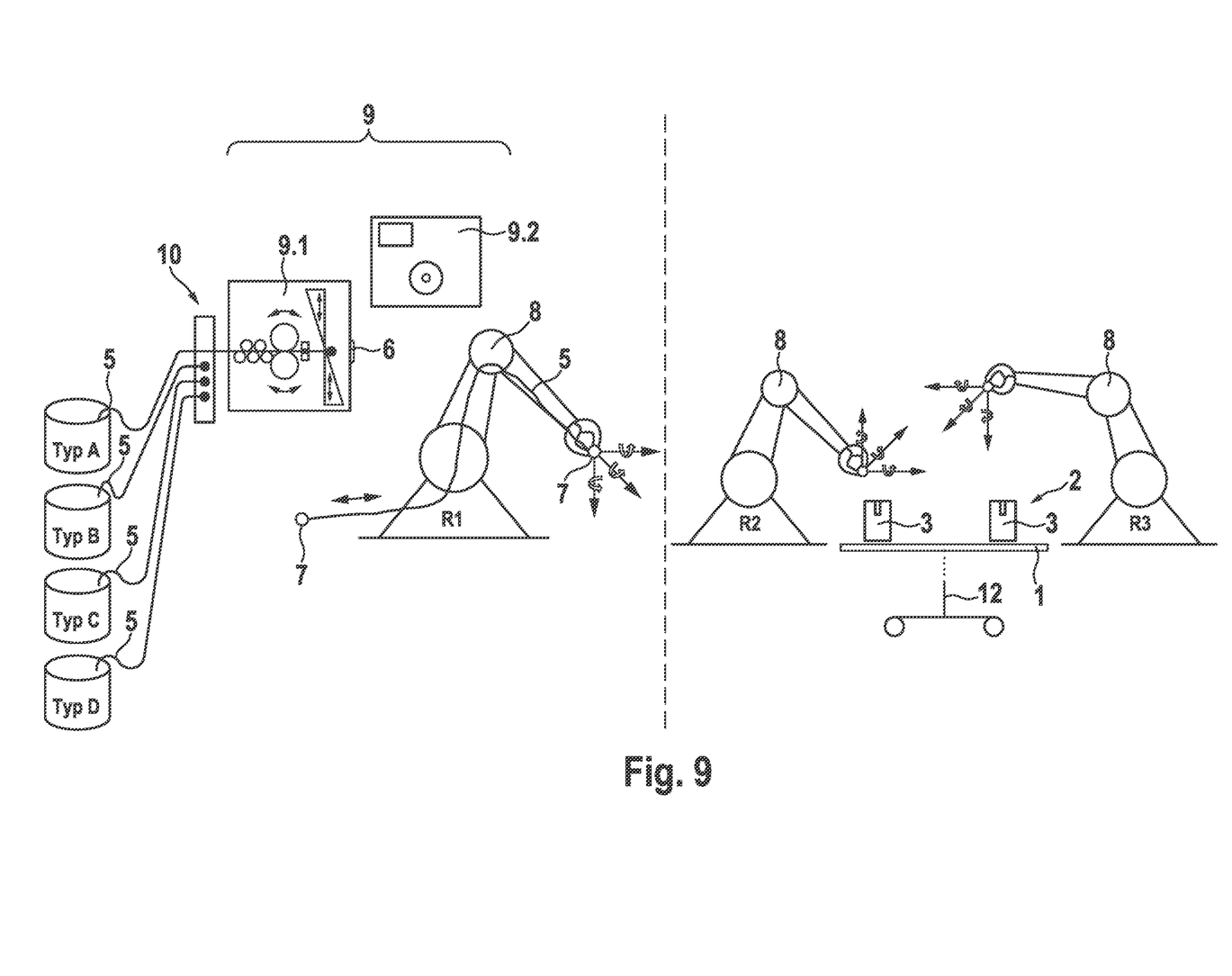
FIG. 9 a sixth embodiment of an exemplary device for carrying out the method according to the invention.

FIG. 9 shows a variant of the embodiment according to FIG. 8, in which a separate single-arm jointed-arm robot 8 is provided for removing the cut-to-length cables 5 from the automatic cable-cutting machine 9.1 and for wire-end treatment of the cut-to-length cables 5 with the aid of the automatic wire-end treatment machine 9.2. This passes the wire-end treated cables 5 on to two further single-arm jointed-arm robots 8 collaborating for the wiring. The collaborative wiring process has been described with reference to FIG. 5.

Figure 10:
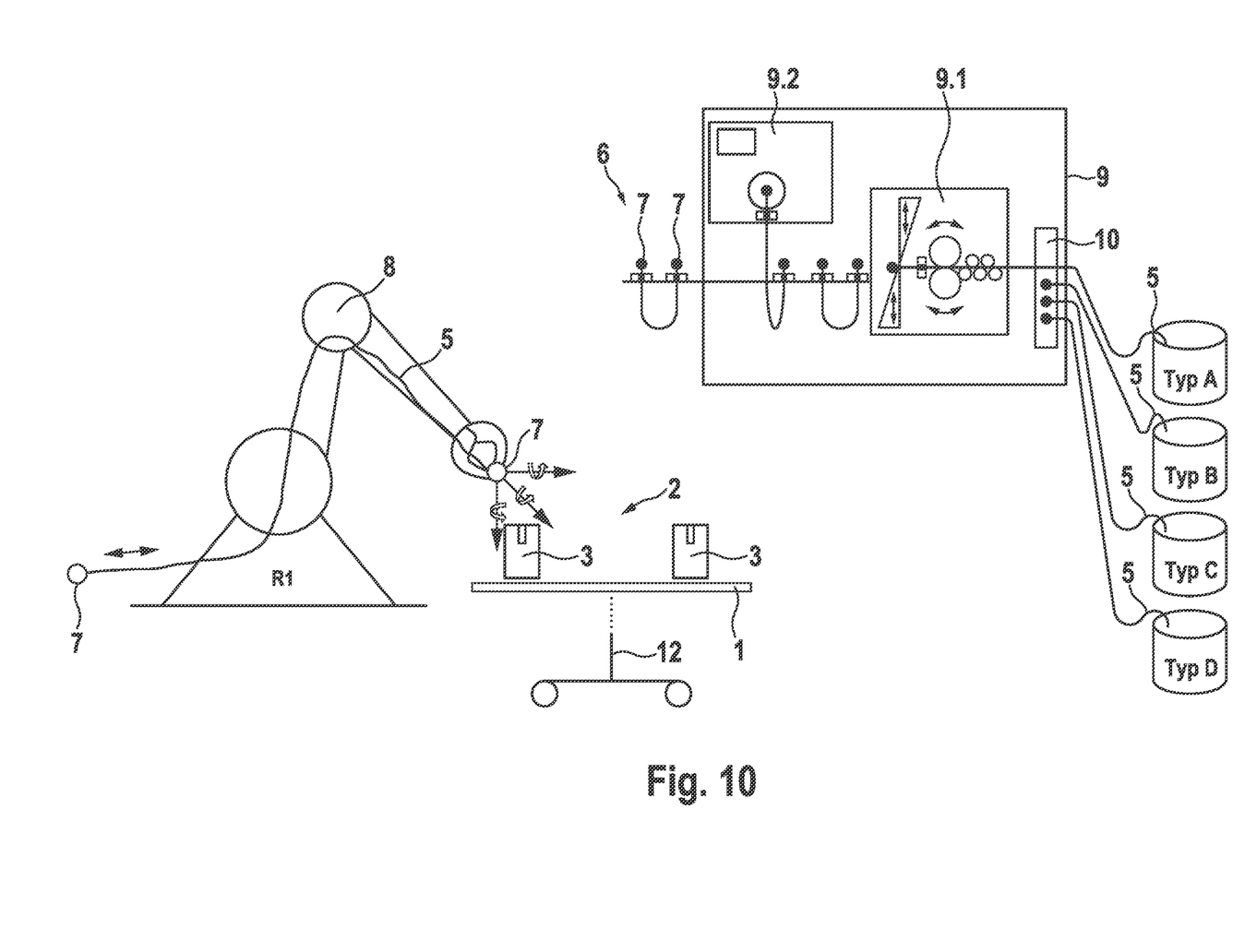
FIG. 10 a seventh embodiment of an exemplary device for carrying out the method according to the invention.

FIG. 10 shows a further embodiment of a device according to the invention, in which a single-arm articulated robot 8 obtains prefabricated cables 5 supplied via a cable assembly system 9. The cable assembly plant 9 has an automatic cable cutting machine 9.1, to which cable 5 of type A-D is selectively fed via a wire changer 10. The cut-to-length cable 5 is fed to an automatic wire end processing machine 9.2, which has an output via which the finished, preassembled cables 5 are output individually, i.e. sequentially in a predetermined laying sequence. The preassembled cables 5 are flexible and are provided by the cable assembly machine 9 at an interface 6 in a U-shaped geometry. The cables 5 are held at their ends 7 so that the articulated arm robot 8 can remove the assembled cable 5 from the cable assembly system 9 with a defined arrangement of the cable ends 7 via the cable ends 7.

Figure 11:
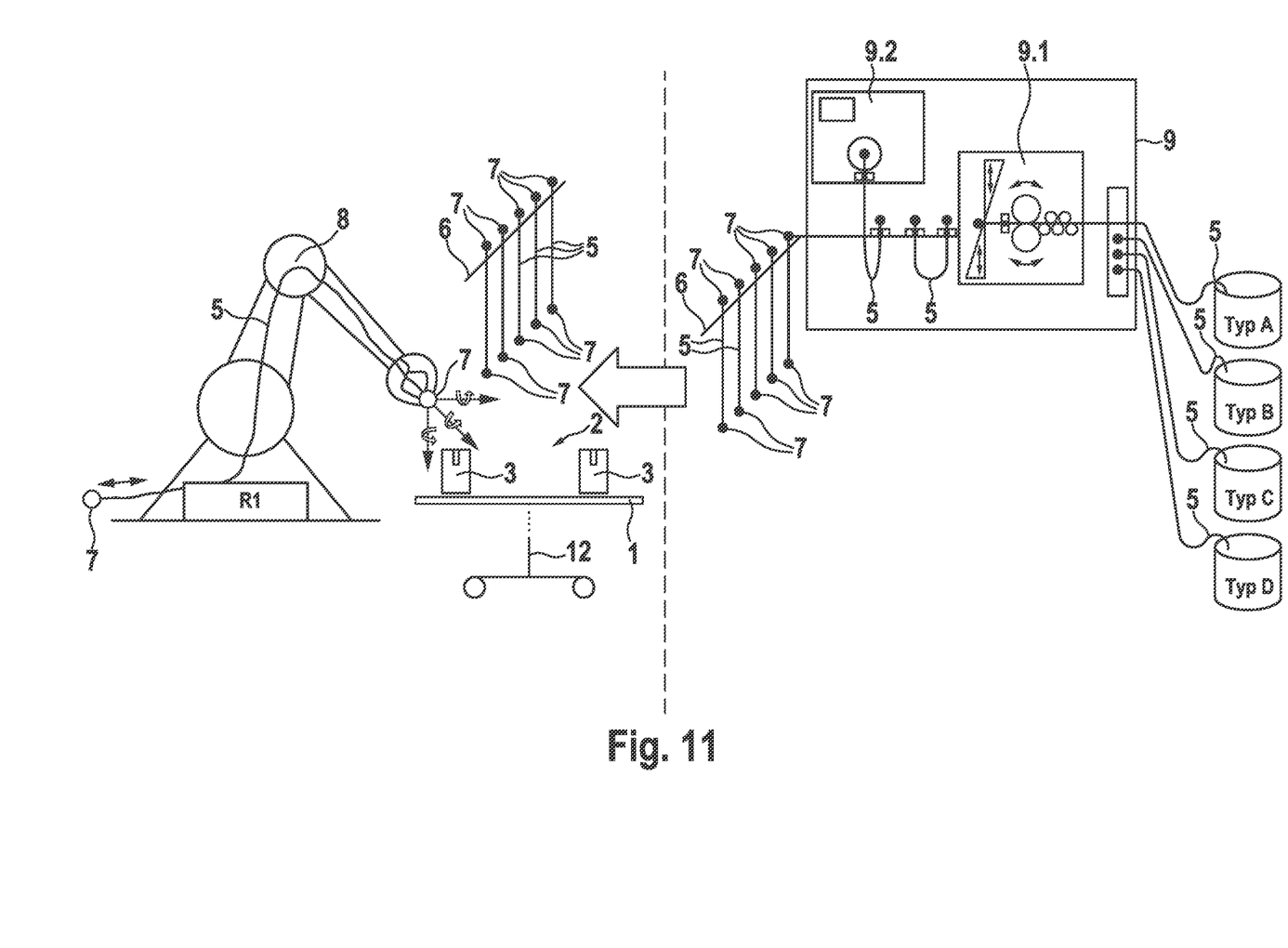
FIG. 11 an eighth embodiment of an exemplary device for carrying out the method according to the invention.

The embodiment shown in FIG. 11 differs from the embodiment shown in FIG. 10 in that the cable assembly plant 9 is provided separately from the device for carrying out the process. Consequently, the cable assembly plant 9 produces a transfer interface 6 formed as a magazine with a plurality of preassembled cables 5, which are arranged in the transfer interface 6 in a predetermined wiring sequence relative to one another and with a predetermined orientation, so that the jointed-arm robot 8 can remove the individual wires 5 from the magazine in a defined manner, for which purpose the magazine is aligned in a predetermined arrangement and orientation relative to the jointed-arm robot 8. The jointed-arm robot 8 may further comprise a recognition device, for example an optical recognition device, to distinguish the individual wires 5 in the magazine.

Figure 12:
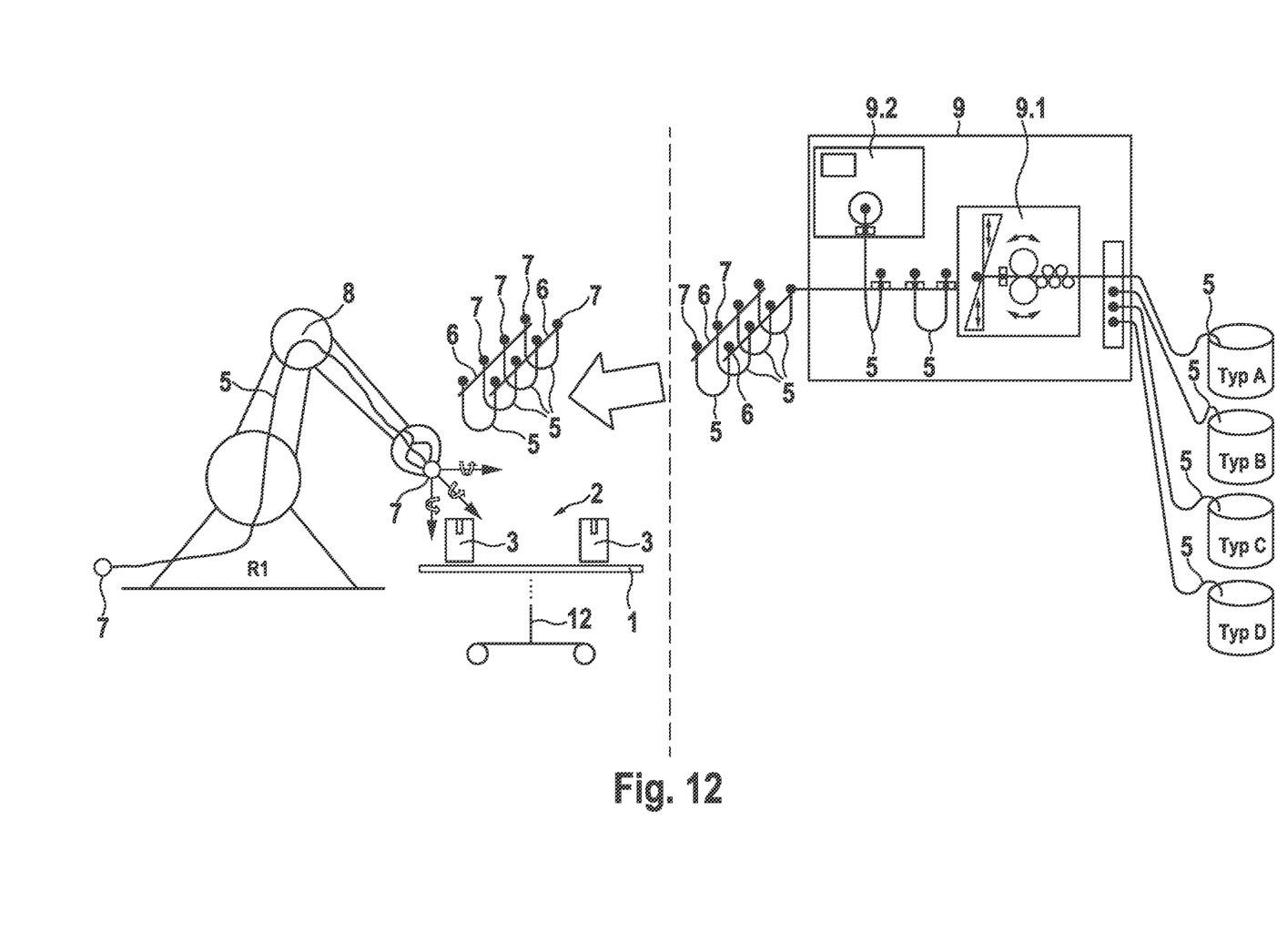
FIG. 12 a ninth embodiment of an exemplary device for carrying out the method according to the invention.

Deviating from the embodiment shown in FIG. 11, the embodiment shown in FIG. 12 has a cable assembly system 9 in which the cable 5 is held at its two opposite ends 7 in the transfer interface 6 designed as a magazine and is thus arranged in a defined manner, facilitating the removal of the cable 5 with the aid of the articulated arm robot 8.

The features of the invention disclosed in the foregoing description, in the drawings as well as in the claims may be essential to the realization of the invention both individually and in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for robotically wiring electrical components of an electrical switchgear arranged on a mounting plate, comprising:
   Providing a planning of a switchgear comprising at least location information and orientation information about a plurality of electrical components of the switchgear on a mounting plate and wiring information about a plurality of electrical wirings between every two of the electrical components;
   Extracting a cable routing including a cable source coordinate, a cable destination coordinate, and a routing path between the cable source coordinate and the cable destination coordinate from the wiring information for at least one of the plurality of wirings;
   Generating trajectory and/or vector points along the cable routing and parameterizing the trajectory and/or vector points to generate a robot controller;
   Controlling a robot with the robot controller; and
   Applying a test routine to the wiring information to determine a degree of automation of the wirings, and adjusting the wiring information to maximize the degree of automation.

2. The method according to claim 1, wherein, when providing a planning of the switchgear, component information is further provided from the planning.

3. The method according to claim 2, wherein the component information comprises at least a dimension and/or a contour of the mounting plate, a type of at least one of the electrical components or of a further component of the electrical switchgear, a connection type of at least one of the electrical components, a connection coordinate and/or vector of at least one of the electrical components, and/or a geometry of at least one of the electrical components.

4. The method according to claim 1, comprising optically detecting an actual arrangement of the electrical components on the mounting plate and matching the location information and orientation information to the actual arrangement.

5. The method according to claim 4, wherein the optical detection of the actual arrangement of the electrical components on the mounting plate comprises the optical detection of obstacles and/or the simultaneous determination of deviations between the location information and orientation information of the planning and the actual arrangement of the electrical components on the mounting plate as well as the simultaneous adjustment of the cable routing.

6. The method according to claim 1, comprising optically detecting an actual arrangement of the electrical components on the mounting plate and adjusting the cable routing according to a detected offset between the actual arrangement of the electrical components and the location information and orientation information.

7. The method according to claim 1, comprising generating additional trajectory and/or vector points outside the cable routing that are taken into account when parameterizing the trajectory and/or vector points to generate the robot control.

8. The method of claim 7, wherein generating additional trajectory and/or vector points outside of the cable routing comprises relocating trajectory and/or vector points lying on the cable routing to lie outside of the cable routing.

9. The method of claim 7, wherein the additional trajectory and/or vector points are generated outside of the cable routing at locations of the cable routing where the cable routing has a change in direction.

10. The method of claim 9, wherein generating additional trajectory and/or vector points outside of the cable routing comprises generating trajectory and/or vector points that lie on a trajectory curve that has a certain minimum radius.

11. The method of claim 10, wherein the trajectory and/or vector points fora first wire having a first conductor cross-section greater than a second conductor cross-section of a second wire are generated along a trajectory curve having a radius greater than the radius of the trajectory curve along which the trajectory and/or vector points for the second wire are generated.

12. The method of claim 9, wherein the cable routing has a 90° change in direction.

13. The method according to claim 1, comprising extracting a wire connection direction from the wiring information and generating trajectory and/or vector points along the wire connection direction and parameterizing these trajectory and/or vector points to generate the robot control.

14. The method according to claim 1, comprising extracting a cable end treatment from the wiring information, wherein the method comprises parameterizing a gripping motion adapted to the cable end treatment for controlling the robot.

15. The method according to claim 1, wherein, in the case where a laying path of one of the electrical wirings having a 90° change of direction is extracted during the extracting, additional trajectory and/or vector points are generated which are upstream of the outer radius of the 90° change of direction by a distance.

* * * * *